United States Patent
Anguiano et al.

(10) Patent No.: US 11,980,903 B2
(45) Date of Patent: May 14, 2024

(54) FOOD ARTICLE SPRAYER

(71) Applicants: Rogelio J. Anguiano, American Fork, UT (US); Monica Lopez, American Fork, UT (US)

(72) Inventors: Rogelio J. Anguiano, American Fork, UT (US); Monica Lopez, American Fork, UT (US)

( * ) Notice: Subject to any disclaimer, the term of this patent is extended or adjusted under 35 U.S.C. 154(b) by 26 days.

(21) Appl. No.: 17/229,257

(22) Filed: Apr. 13, 2021

(65) Prior Publication Data

US 2021/0229125 A1 Jul. 29, 2021

Related U.S. Application Data

(63) Continuation of application No. 16/889,502, filed on Jun. 1, 2020, now Pat. No. 11,000,871.

(51) Int. Cl.
*B05B 13/04* (2006.01)
*A21D 8/08* (2006.01)
*A23P 20/18* (2016.01)

(52) U.S. Cl.
CPC .............. *B05B 13/041* (2013.01); *A21D 8/08* (2013.01); *A23P 20/18* (2016.08)

(58) Field of Classification Search
None
See application file for complete search history.

(56) References Cited

U.S. PATENT DOCUMENTS

| | | | |
|---|---|---|---|
| 2,080,103 A | | 5/1937 | Zarstschenzeff |
| 3,250,247 A | | 5/1966 | Beaman |
| 4,465,714 A | | 8/1984 | Petro |
| 2014/0033969 A1 | | 2/2014 | Leas et al. |

FOREIGN PATENT DOCUMENTS

| WO | WO-2008152098 A2 * | 12/2008 | ............. B05B 5/087 |
|---|---|---|---|
| WO | WO-2009152324 A1 * | 12/2009 | ............. B05B 15/62 |

* cited by examiner

*Primary Examiner* — Jyoti Chawla
(74) *Attorney, Agent, or Firm* — Holland & Hart LLP

(57) ABSTRACT

The systems and methods described herein relate to basting food-related items. The food-related items may include baked goods, baking sheets, cake pans, cupcake pans, and the like. The food items may include pastries, baked good, pies, etc. The item to be basted, glazed, or otherwise deposited with a fluid is placed in a target area. A movable head is then able to move along a track and distribute a fluid over the fluid-related item. The item is stationary during the process.

5 Claims, 5 Drawing Sheets

FOOD ARTICLE SPRAYER

CROSS-REFERENCE TO RELATED APPLICATION

This is a continuation application of U.S. patent application Ser. No. 16/889,502, filed 1 Jun. 2020, and entitled FOOD ARTICLE SPRAYER, pending, and U.S. Pat. No. 10,668,495, filed 15 Mar. 2017, and entitled FOOD ARTICLE SPRAYER, the disclosures of which are incorporated in their entirety, by this reference.

BACKGROUND

The present disclosure, for example, relates to food sprayers, and more particularly to low maintenance food sprayers.

In certain applications food may need to be glazed or food trays may need to be coated and/or prepared prior to use in baking. For example, the food may require a butter or oil glaze and the food trays may need oil or another substance to prevent food from sticking to the food trays. Conventional bakery sprayers on the market are bulky, expensive, and messy. Many sprayers utilize conveyor belts and require a tray to travel on the conveyor belt and pass through a semi-enclosed area. The conveyor belts take time to pass the food through sprayers and the belts often travel at a single speed. Conveyor belt and spray system typically take up significant space and require significant time to fully clean and sanitize after use. Therefore, there exists a need for a food sprayer that addresses these and other challenges.

SUMMARY

The systems and methods described herein relate to basting food-related items. The food-related items may include food items (e.g., baked goods) or cooking/baking items (e.g., baking sheets, cake pans, cupcake pans, and the like). The food items may include pastries, breads, baked good, pies, etc. The item to be basted, glazed, or otherwise deposited with a fluid is placed in a target area. A spraying head is movable along a track to distribute a fluid over the fluid-related item. The item is typically stationary during the process.

In one embodiment, a food article sprayer is described. The food article sprayer includes a base, a track coupled to the base, a head movably coupled to the track, and at least one nozzle carried by the head. The nozzle is directed to a target area on the base. The target area is configured to hold at least one food-related article. A supply hose is removably coupled to the nozzle. The supply hose is configured to deliver a fluid to the nozzle to be sprayed on the at least one food-related article.

In some embodiments, the track may be oriented substantially horizontally The at least one nozzle may be oriented offset horizontally and vertically relative to the track. In some instances, the at least one nozzle may include at least two nozzles. The at least two nozzles may be oriented in different horizontal and vertical directions. In another embodiment, the at least one nozzle may include at least four nozzles. The at least four nozzles may be oriented in different horizontal and vertical directions.

In some embodiments, the head may also include a handle and an activation switch proximate the handle. In some embodiments, the head may be configured to be mechanically movable relative to the track by a user. In some embodiments, the activation switch and handle may be simultaneously operational by a single user.

In another embodiment, a method of spraying food-related articles is described. The method includes providing a sprayer device comprising a head, at least one nozzle carried by the head, and a track. The method also includes placing a food-related article beneath the at least one nozzle and activating the at least one nozzle to spray a fluid on the food-related article. The method includes mechanically moving the head from a first position on the track to a second position on the track. The method also includes deactivating the at least one nozzle.

In other embodiments, the fluid may be a glazing medium. In one example, the food-related article may comprise one or more baked goods, pans, or molds. In one embodiment, the at least one nozzle may include at least four nozzles, and the method may include orienting each nozzle differently relative to the food-related article. In another embodiment, the different orientations for the nozzles may provide three-dimensional coverage of the food-related article with the fluid. In a further embodiment, activating the at least one nozzle may include activating a valve proximate the at least one nozzle.

In another embodiment, a food-related article sprayer is described. The food-related article sprayer includes a base, a track coupled to the base, a head movably coupled to the track and at least one nozzle carried by the head. The at least one nozzle is directed to a target area on the base. The target area is configured to hold at least one food-related article. A supply hose is removably coupled to the nozzle. The sprayer includes an activation switch and a pump electrically connected to the activation switch and coupled in flow communication with the supply hose. A container is coupled to the pump, the container retains a volume of product to be applied to the food-related article by the at least one nozzle.

In some embodiments, the at least one nozzle may be offset from the head predetermined distance. The at least one nozzle may be offset horizontally and vertically relative to the head. In another embodiment, the head may include a handle and an activation switch proximate the handle. In some instances, the at least one nozzle may include at least four nozzles. The at least four nozzles may be oriented in different horizontal and vertical directions. In another embodiment, the head may be configured to be mechanically movable relative to the track by a user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
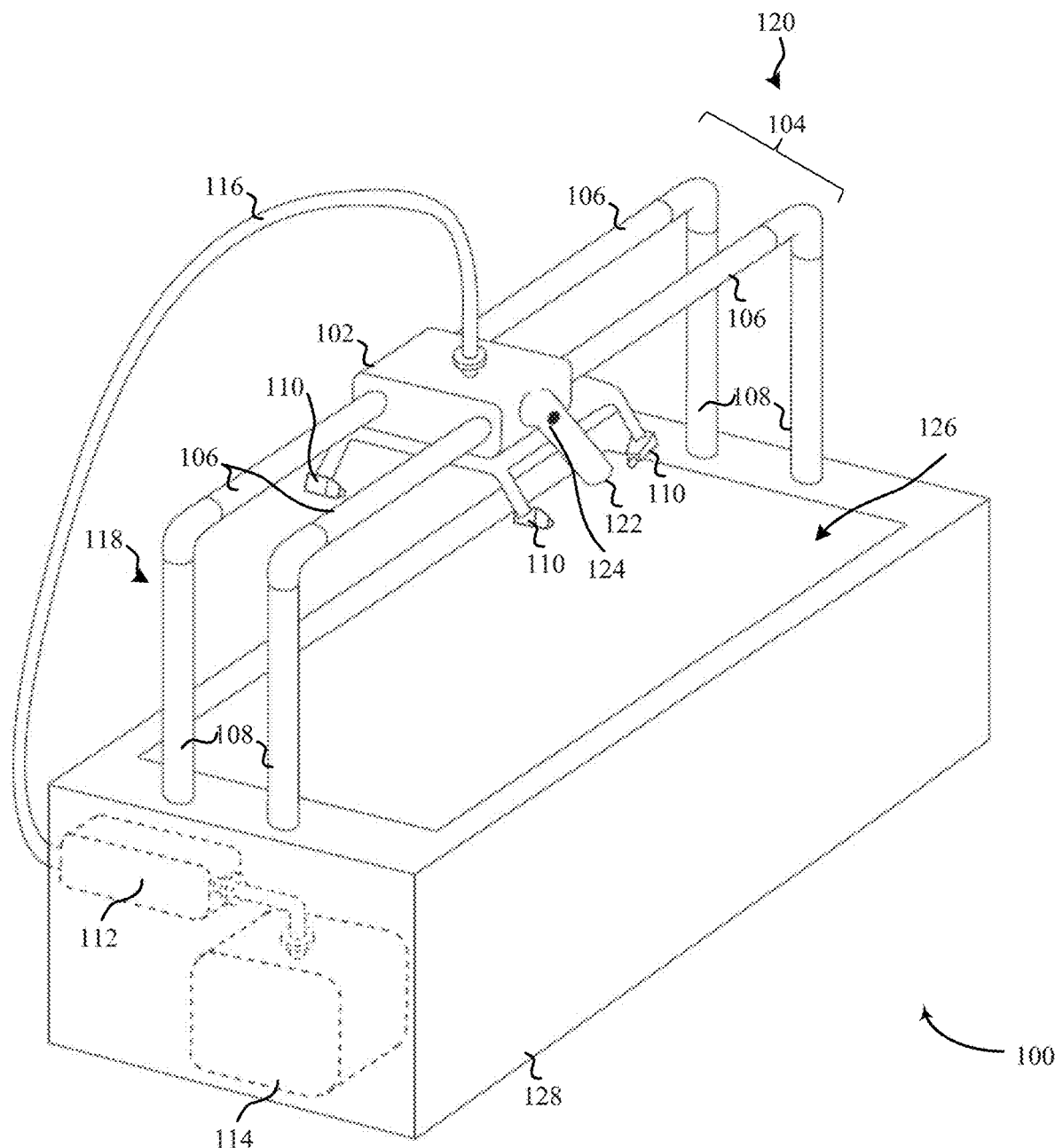
FIG. 1 is a diagram illustrating an exemplary food article sprayer in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to the food industry. More specifically, the systems and methods described herein relate to a relatively unobtrusive, quick and user friendly food sprayer. The food article sprayer may comprise a pump and liquid container to supply the spraying fluid to the food sprayer. The food article sprayer may fit on an existing table top or other flat surface or may include an adjustable base to properly align the food article sprayer with its user. The food article sprayer may incorporate a head movably coupled to a track. One or more nozzles may be attached to the head which may distribute the liquid at a desired orientation onto a food article or baking sheet.

FIG. 1 is an example of a food article sprayer 100. The sprayer 100 may include a mobile head 102 movably positioned on a track 104. The track 104 may include one or more horizontal members 106 which may be connected to one or more supports 108. At least one nozzle 110 may be connected to head 102. The nozzle 110 may be connected to a pump 112 which may be coupled to a liquid container 114 via a supply line 116.

In some embodiments, the track 104 may include two horizontal members 106 which may maintain the stability of the head 102. For example, two or more horizontal members 106 may prevent the head 102 from rotating or otherwise altering the horizontal positioning of the head 102. In some other embodiments, the track 104 may include more or fewer horizontal members 106. For example, a single horizontal member 106 may adequately support the head 102 and maintain the positioning of the head if the head 102 travels along a flat upper surface of the horizontal member 106.

The head 102 may be horizontally movable along the track 104. In some instances, the head 102 may be movable from a first location proximate a first end 118 of the track 104 to a second location proximate a second end 120 of the track 104. The first location and second location may alternatively be between the first end 118 and second end 120 of the track 104. The head 102 may glide along the track 104 through a relatively loose fit. In other embodiments, the head 102 may include one or more bearings to aid in the mobility of the head. In another embodiment, the head 102 and/or the track 104 may be lubricated or include low friction materials. In one embodiment, a handle 122 may be proximate the head 102 and may enable a user to manually move the head 102 at a desired speed along the track 104. In another embodiment, the head 102 may be powered and/or automated, and may be programmable to move at different speeds along the track 104.

A user may grasp the handle 122 and manually move the head from a first location to a second location on the track 104. An activation switch 124 may be proximate the handle 122 and may enable a user to activate the nozzle 110. For example, the activation switch 124 may activate a valve proximate the nozzle 110. The activation switch 124 may alternatively and/or additionally activate the pump 112. In either embodiment, the activation switch 124 may enable a user to discharge a fluid from the nozzle 110 which may coat, for example, a food item or baking pan which may be placed beneath the head 102 in a target area 126.

In some embodiments, the sprayer 100 may include a base 128. The base 128 may be a portion of the sprayer 100 or may be mountable onto another table or flat surface. The base 128 may house the pump 112 and liquid reservoir 114. In some embodiments, the base may be mobile and/or may be height adjustable. If the sprayer 100 is mountable onto surfaces, this may enable the sprayer 100 to be easily movable from one location to a next. It may also make cleaning up the sprayer and surround areas easier.

The number and orientation of the at least one nozzle 110 is variable and may depend upon the food article to be coated. The orientation of the nozzle 110 may be offset vertically and horizontally from the track 104. This orientation may be customizable to the particular food or item being coated. For example, a first application may require two nozzles approximately offset horizontally from the track 104. These nozzles may additionally and/or alternatively be offset radially from the track 104. The orientation of the nozzle(s) 110 may change if the food item is a rounded item. For example, at least four nozzles may be required at varying orientations to fully cover a round or contoured item.

In some further embodiments, the head 102 may rotate radially about the track 104. For example, in select applications, it may be desirable to rotate the head 102 to change the orientation of the at least one nozzle 110 and enable a user to quickly change the target trajectory of the spray of the nozzle 110. This may enable a user to fully apply a fluid to all exposed surfaces of a food object.

Figure 2:
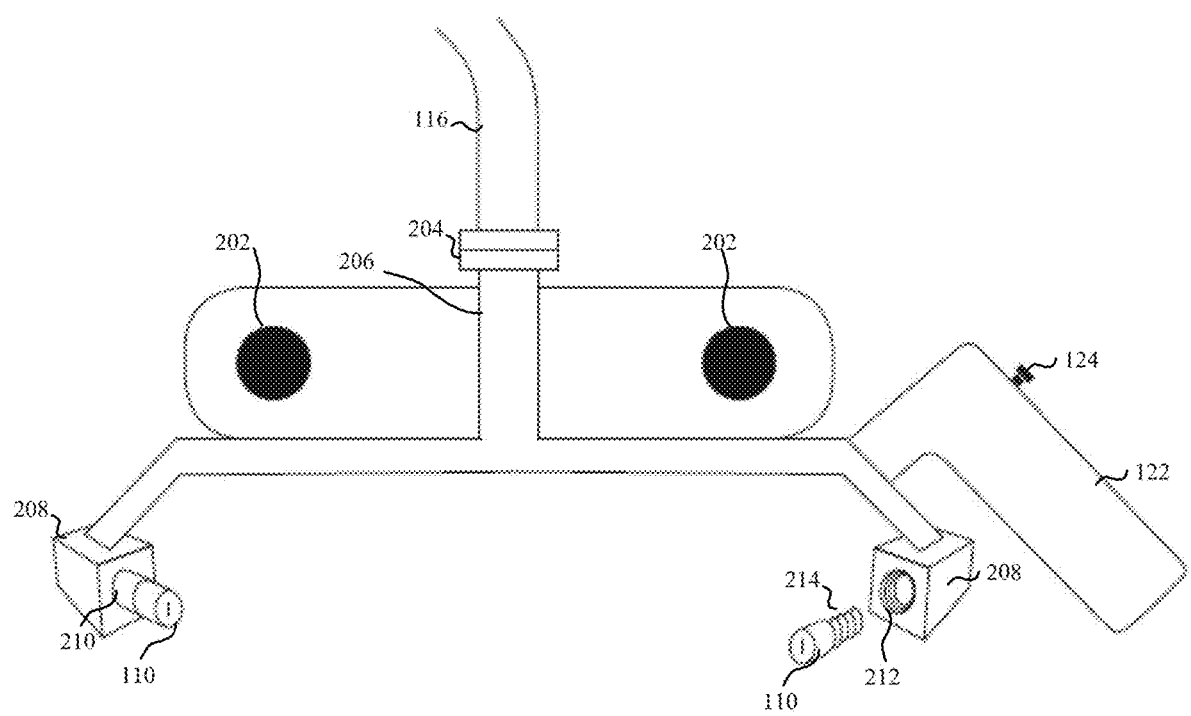
FIG. 2 is a cut-away view of the exemplary food article sprayer in FIG. 1 along lines 2-2.

FIG. 2 is an example of a cutaway view of the head 102 along lines 2-2 in FIG. 1. The head 102 includes a handle 122, activation switch 124, and one or more passages 202 for the horizontal members 106 of the track 104.

The head 102 may also include a supply connection 204 for the supply line 116 to connect to the head 102. The supply connection 204 may be a threaded connection, quick connection, or another connection apparatus. The supply connect 204 may enable the medium to connect to one or more internal passages 206. The internal passages 206 may fluidly connect the supply line 116 to a valve 208 proximate the nozzle 110, in this instance two nozzles 110.

The valve 208 may be an on/off valve to enable the coating fluid to leave the nozzle 110. In some embodiments, the valve 208 may be coupled to the activation switch 124 which may cause the basting medium to escape the nozzle 110. For example, in some embodiments, the liquid reservoir 114 may be pressurized and opening the valve 208 may cause the liquid to flow from the nozzle 110. In other embodiments, the pump may always be in operational mode and the activation switch 124 may open the valve 208 to allow a basting medium to flow from the nozzle 110.

The nozzle 110 may be removably connected to the head 102 in a multitude of ways. For example, the nozzle 110 may be connected to the head 102 via a quick connect connection 210 which, when a nozzle 110 is not inserted, may cause the valve 208 to be in an "off" position. In another embodiment, the nozzle 110 may be connected to the head 102 via a threaded connection. For example, the solenoid 208 may include a thread female joint 212 which may mate with a threaded male joint 214 on the nozzle 110. In some embodiments, the male/female orientation could be reversed, i.e., the nozzle 110 could have the female threads and the solenoid could have the male threads. The threaded connection may again cause the valve 208 to be in an "off" position if a nozzle 110 is not engaged. Other means of attached the nozzles to the head 102 may also be used.

In some embodiments, detachable nozzles 110 may allow different types of basting applications. Nozzle geometry can vary significantly and atomize the basting medium differently. Depending upon the food article or pan to be basted, different nozzles may achieve a more desirable end result.

In other embodiments, the head 102 may be permanently fixed with a desirable number of nozzles 110 and the head may easily attach to the track. For example, the head 102 may clamp or rest upon the track such that different heads 102 may be easily swapped out depending on a desirable basting application.

Figure 3A:
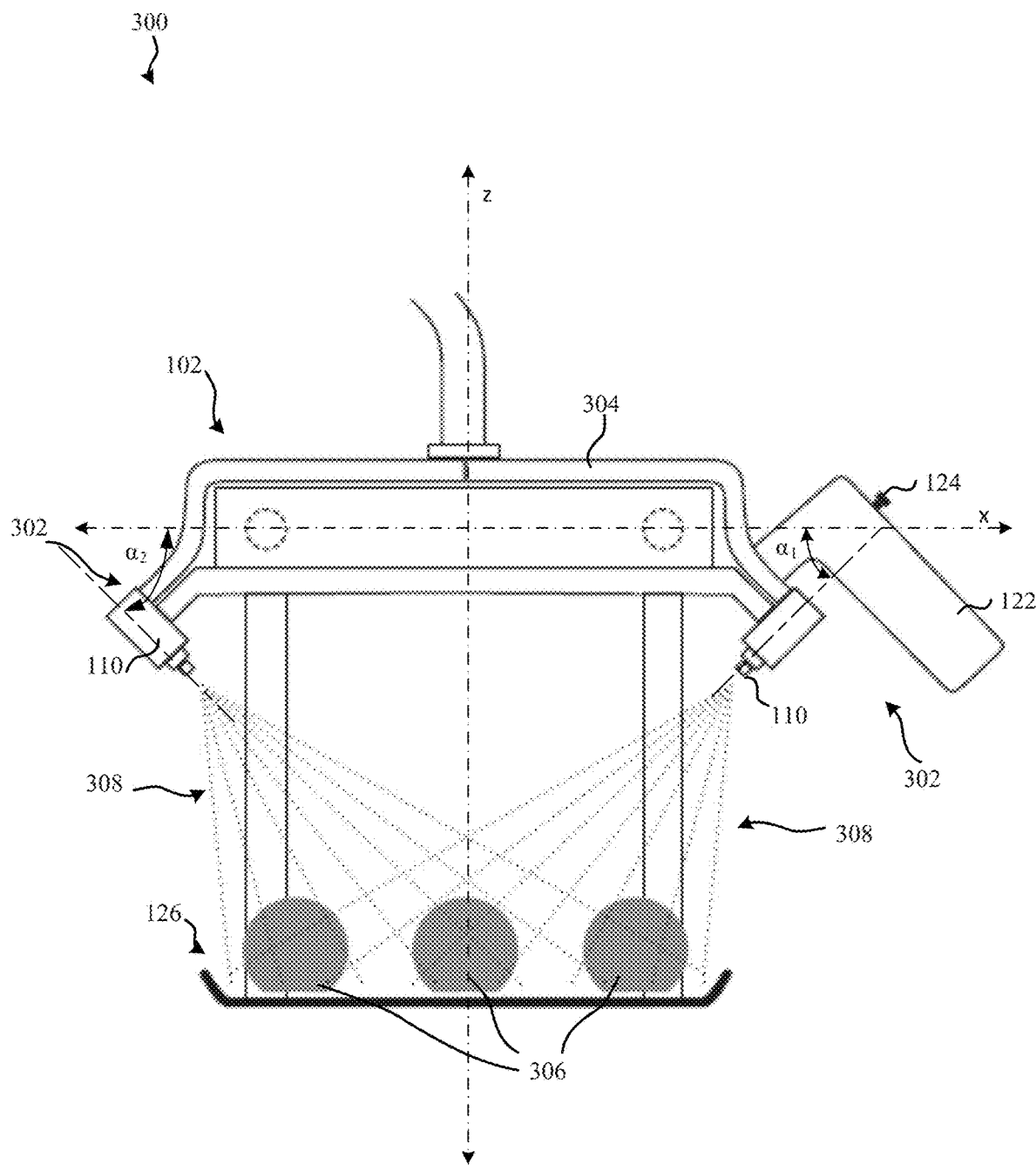
FIG. 3A is a side view of the exemplary food article sprayer with a food-related item.

FIG. 3A displays a side view of a sprayer system 300 showing an alternative variation of a head 102 with a nozzle 302 arrangement. In this embodiment, the nozzles 110 are offset from the head 102 a predetermined distance. The distance may enable the nozzles 110 to be more mobile for specific orientation. For example, the nozzle 110 may be rotatably connected to the head 102 such that the nozzle 110 may be easily movable into a desired location.

In this embodiment, the passages 304 for transferring the fluid from the fluid reservoir to the nozzles may be external to the head 102. For example, the passages 304 may comprise hoses, tubes, or other fluid transfer means which may be routed external to the head 102. This may enable the passages 304 to be replaced and/or cleaned quicker and easier.

Additionally and/or alternatively, the nozzle 110 may have an independent on/off switch. For example, each nozzle 110 may have a switch which enables the nozzle to function or not if the activation switch 124 is triggered. This may enable a user to customize the number of nozzles 110 they desire to use in a specific application. This may also enable a user to quickly customize the sprayer 100 for each application without adding and/or removing a nozzle 110 and/or head 102. A user can quickly energize and/or de-energize a valve proximate the nozzle 110 to turn on or off the nozzle 110 during specific applications.

In the example shown in FIG. 3A, a rounded food item 306 is being glazed in the target area 126. The nozzles 110 are offset from the x-axis in a z-plane to effectuate a spray zone 308 to fully cover the food item 302. The nozzles 110 may be offset an angle α1 and/or α2 from the x-axis. In some embodiments, the angle α1 and α2 may be predetermined. In other embodiments, the angle α1 and α2 may need to be determined for the specific food application.

Figure 3B:
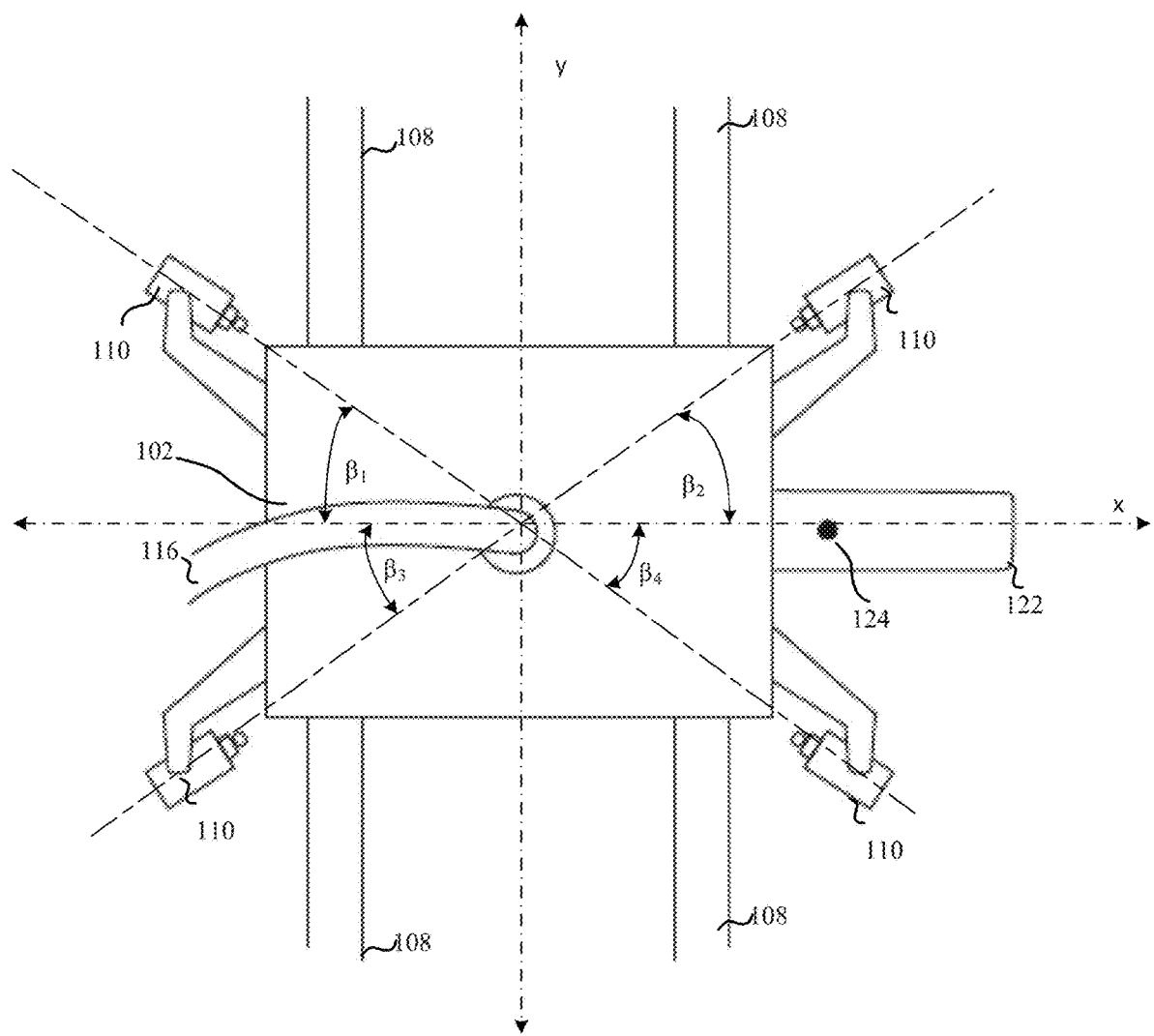
FIG. 3B is top down view of the exemplary food article sprayer.

As shown in FIG. 3B, the nozzles 110 may additionally be offset from the y-axis in an x-plane. For example, the nozzle 110 may be offset in an angle β1. If more than one nozzle 110 is connected and/or active, other nozzles 110 may additionally be offset by angle β2, β3, or β4. The offset angles β1, β2, β3, or β4 do not need to match and in some instances may not match. Each angle β1, β2, β3, or β4 may be different to fully glaze an item.

Figure 4:
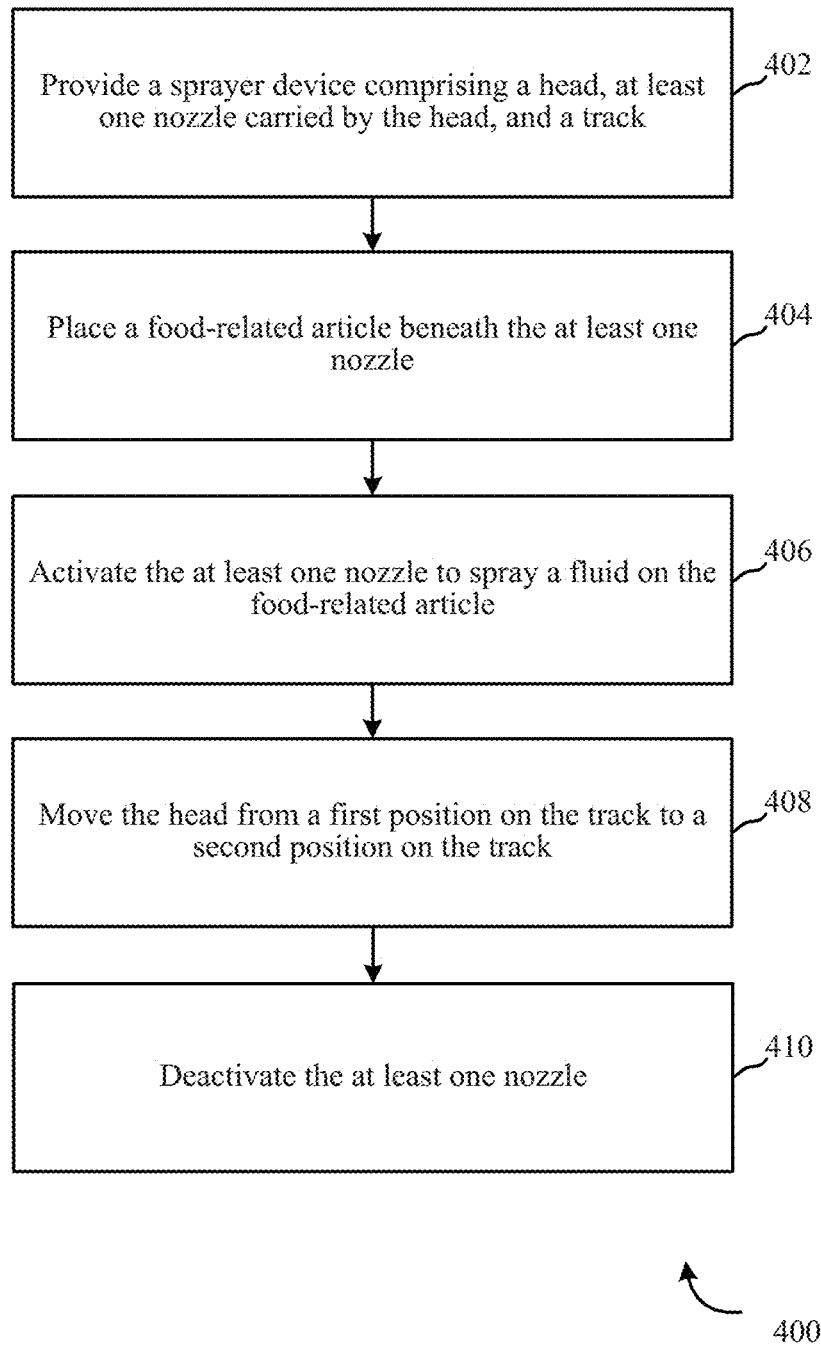
FIG. 4 is a flow chart illustrating one example of a method of spraying food-related articles.

FIG. 4 is a flow chart of method 400 of basting a food item. The method 400 may include providing a sprayer device comprising a head, at least one nozzle carried by the head, and a track 402. The method 400 may further include placing a food-related article beneath the at least one nozzle 404. In some embodiments, the method 400 may include activating the at least one nozzle to spray a fluid on the food-related article 406. The method 400 may include mechanically moving the head from a first position on the track to a second position on the track 408. In some embodiments, the method 400 may include deactivating the at least one nozzle 410.

In some embodiments, the fluid may be a glazing medium. The fluid may be applied to a food-related article. A food-related article may include, for example, one or more baked goods, pans, molds or other food item or food-related item. In some embodiments, the method 400 may include utilizing at least four nozzles. The nozzles may be independently oriented relative to the food-related article. The independent orientation of each nozzle may ensure the food-related article is adequately covered with the fluid. The independent and different orientations may provide three-dimensional coverage of the food related article with the fluid. For example, a rounded food item may require an underside of the article to be glazed. Orienting the nozzles differently may ensure a top side, under side and vertical side of the food item is adequately glazed. Some pans may additionally require unique nozzle orientation. For example, bundt pans have various vertical surfaces that may require unique orientation to properly glaze.

In some embodiments, activating the nozzle may include activating a valve proximate the nozzle. For example, an activation medium may cause a valve to turn into an on position and allow the fluid to flow through the nozzle. The valve could incorporate a number of valves with an on/off position. In further embodiments, the valve may additionally meter flow through a valve. For example, in some applications, a heavier fluid flow may be desired. In other embodiments, a light glaze may only be necessary. The valve may regulate not only flow to the nozzle but also the amount of flow.

While the technology of the present application is described with respect to food articles, the technology disclosed herein may be applicable to other types of spraying devices. Moreover, the technology disclosed herein will be described with reference to certain exemplary embodiments. The word "exemplary" is used herein to mean "serving as an example, instance, or illustration." Any embodiment described herein as "exemplary" is not necessarily to be construed as preferred or advantageous over other embodiments absent a specific indication that such an embodiment is preferred or advantageous over other embodiments. Moreover, in certain instances only a single "exemplary" embodiment is provided. A single example is not necessarily to be construed as the only embodiment. The detailed description includes specific details for the purpose of providing a thorough understanding of the technology of the present patent application. However, on reading the disclosure, it will be apparent to those skilled in the art that the technology of the present patent application may be practiced with or without these specific details. In some descriptions herein, generally understood structures and devices may be shown in block diagrams to aid in understanding the technology of the present patent application without obscuring the technology herein. In certain instances and examples herein, the term "coupled" or "in communication with" means connected using either a direct link or indirect link.

The previous description of the disclosed embodiments is provided to enable any person skilled in the art to make or use the present invention. Various modifications to these embodiments will be readily apparent to those skilled in the art, and the generic principles de-fined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. A method of spraying articles, comprising:
   providing a sprayer device comprising a head, a plurality of nozzles carried by the head, and a track;
   receiving at least one article on a support surface arranged beneath the plurality of nozzles;
   activating the plurality of nozzles to spray a fluid on the at least one article;
   sliding the head from a first position on the track to a second position on the track in a direction parallel with the support surface while the at least one article remains stationary and the plurality of nozzles are activated.

2. The method of claim 1, wherein the at least one article is a food-related article.

3. The method of claim 2, wherein the fluid is a glazing medium.

4. The method of claim 2, wherein the food-related article comprises one or more baked goods, pans, or molds.

5. The method of claim 1, wherein the plurality of nozzles includes at least four nozzles, the method further comprising orienting each nozzle at a different angle relative to the at least one article.

* * * * *

UNITED STATES PATENT AND TRADEMARK OFFICE
CERTIFICATE OF CORRECTION

PATENT NO. : 11,980,903 B2
APPLICATION NO. : 17/229257
DATED : May 14, 2024
INVENTOR(S) : Rogelio J. Anguiano et al.

It is certified that error appears in the above-identified patent and that said Letters Patent is hereby corrected as shown below:

On the Title Page

In (63) Related U.S. Application Data, please add the prior application number 15/460,030 after the Pat. No. 11,000,871 that the line reads: Continuation of application No. 16/889,502, filed on Jun. 1, 2020, now Pat. No. 11,000,871, which is a continuation of application No. 15/460,030, filed on Mar. 15, 2017, now Pat. No. 10,668,495.

Signed and Sealed this
Fifth Day of November, 2024

Katherine Kelly Vidal
*Director of the United States Patent and Trademark Office*